UNITED STATES PATENT OFFICE.

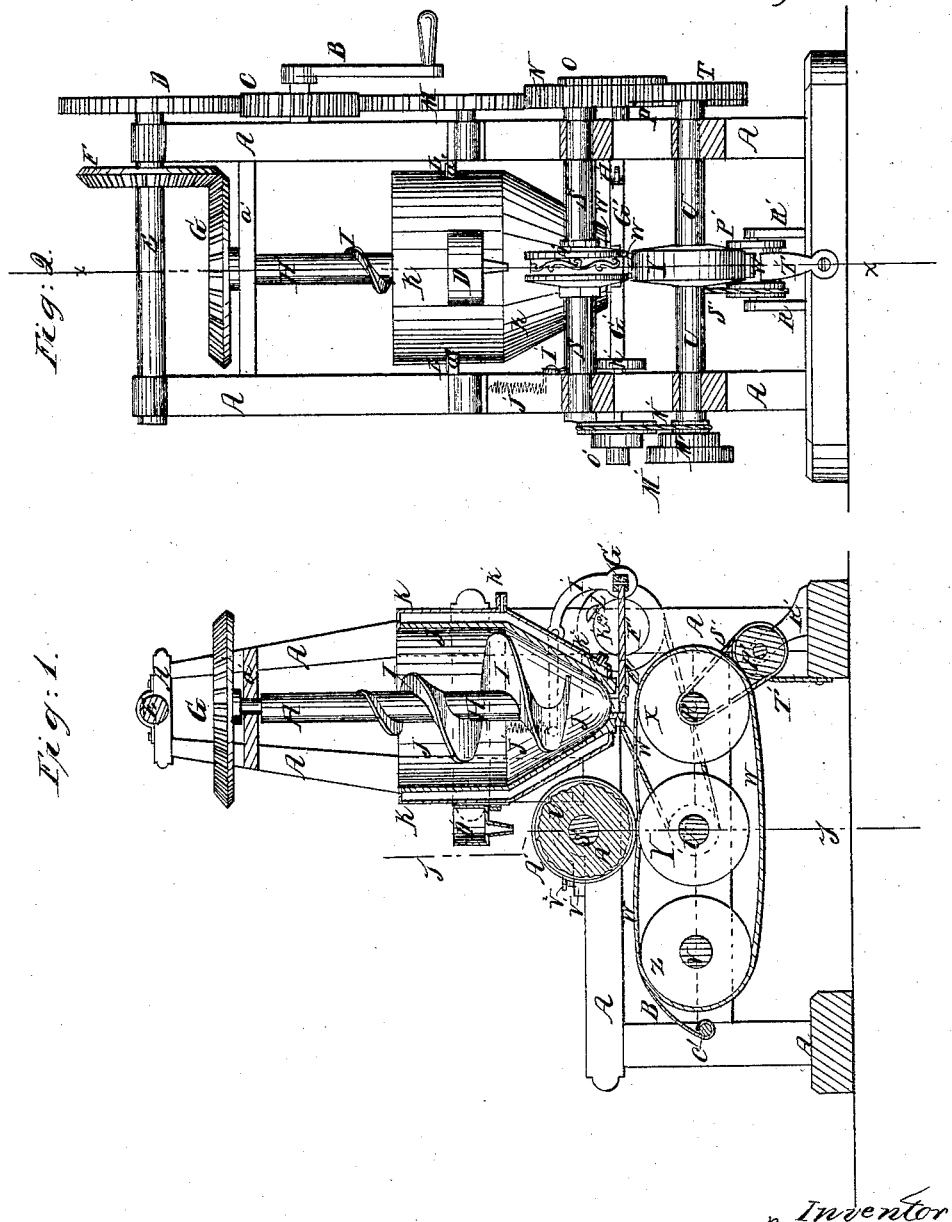

THOS. J. CLOSE, OF PHILADELPHIA, PENNSYLVANIA.

MACHINE FOR MAKING MOLDINGS.

Specification forming part of Letters Patent No. 58,599, dated October 9, 1866.

*To all whom it may concern:*

Be it known that I, THOMAS J. CLOSE, of Philadelphia, in the county of Philadelphia and State of Pennsylvania, have invented a new and useful Improvement in Machines for Manufacturing Moldings; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line $x\,x$, Fig. 2. Fig. 2 is a front view of the same, partly in section, through the line $y\,y$, Fig. 1.

Similar letters of reference indicate like parts.

My invention has for its object to furnish an improved machine by means of which composition moldings of any desired length and of any desired pattern may be easily, quickly, and accurately manufactured; and it consists, first, in the cone-shaped hopper, formed by combining the outer and inner cases with each other and with the frame of the machine; second, in the combination, with the hopper, of a conveyer, for the purpose of conveying the material from the hopper to the die and from the die to an inclined bench or table; third, in the combination of the die-wheel with the conveyer and with the frame of the machine, for the purpose of imprinting the desired design upon the molding; fourth, in the combination, with the conveyer, of an adjustable slide or scraper, for the purpose of removing the completed molding from the conveyer and transferring it to the inclined table, or other receptacle; fifth, the combination, with the hopper, of a screw, for the purpose of forcing the composition through the discharging-orifice of the hopper; sixth, the combination of the valve, arm, levers, and cam with each other, with the hopper, and with the frame of the machine, for the purpose of controlling and regulating the escape of the material through the discharging-orifice; seventh, the combination of a rubber and scraper with each other and with the conveyer, so that the said conveyer may be perfectly clean when it receives the composition from the hopper; eighth, the combination of an oil-cup with the die-wheel, the whole being constructed and arranged as hereinafter more fully described.

A is the frame which supports the various parts of the machine, and to which the said parts are attached. B is the crank by which motion is communicated to the machine. When the machine is driven by power the crank B will be replaced with a pulley.

C is a gear-wheel attached to the crank shaft, and which gears into the wheel D. The gear-wheel D is attached to the end of the shaft E, which revolves in bearings upon the top of the frame A, as shown in Figs. 1 and 2.

F is a bevel-gear wheel attached to the shaft E, and which meshes into the bevel-gear wheel G, attached to the upper end of the shaft H. This shaft is supported by and revolves in bearings in the cross-piece $a^1$ of the frame A, as shown in Figs. 1 and 2. This cross-piece $a^1$ also resists the upward pressure of the screw while forcing the material into the lower part of the hopper.

Upon the lower part of the shaft H is formed a screw-thread or spiral flange, I. This thread or flange I gradually increases in size or projection, and then gradually diminishes, to adapt it to the contracting form of the lower part of the hopper, into which it fits, the hopper thus becoming the lower support or bearing of the shaft. The object of this screw is to keep the material constantly mixed or stirred, and at the same time forced down into the lower part of the hopper, so that it may be forced out of the hopper in a constant stream and in as large a quantity as the size of the discharging-orifice will permit.

The hopper J K is double—that is to say, it consists of an outer and inner case securely attached to each other and having a space between them, as shown in Fig. 1.

L are outwardly-projecting flanges attached to outer case, K, on opposite sides of the hopper, and which must be of sufficient strength to sustain the weight of the hopper and its contents and resist the downward pressure of the flange or screw-thread I, and should not exceed in length one-quarter the circumference of the outer case, K, of the hopper. The hopper is sustained by these flanges L, resting upon the flanges $a^2$, attached to the sides of the frame A of the machine, as shown in Fig. 2.

The material of which composition moldings is made is of such a nature that it requires to be kept warm while being worked. This is accomplished by admitting steam into the space between the outer and inner cases, J and K, of the hopper. The steam may be admitted through the pipe $k^1$ and allowed to escape or may be drawn off when condensed through the pipe $k^2$. When steam is not attainable the same thing may be accomplished by water, the water being introduced through the pipe $k^2$, or at any other convenient point, and heated by a gas-jet or other external heat, the pipe $k^1$ acting as a safety-valve.

M is a gear-wheel pivoted to the side of the frame A, and which communicates motion from the gear-wheel C to the gear-wheels N and O. The gear-wheel O is pivoted to the side of the frame A, and communicates motion from the gear-wheel M to the wheel P, attached to the rear conveyer-shaft, R. The gear-wheel N is attached to the end of the die-shaft S, and communicates motion to it, and at the same time communicates motion from the gear-wheel M to the gear-wheel T, attached to the end of the central conveyer-shaft, U. The shafts R, U, and V revolve in bearings attached to the frame A, the shafts R and U receiving motion from the gear-wheels P and T, and the shaft V from the friction of the conveyer W. To the central parts of the shafts R, U, and V are attached pulleys or wheels X Y Z, which carry the conveyer W. This conveyer is an endless metallic band of sufficient breadth to receive the material in a continuous stream from the hopper J K, convey it to the die-wheel A', from which it receives the desired impression, and thence to a bench, table, or inclined apron placed in front of the machine for its reception, or to any other suitable receiver. The completed molding is removed from the conveyer W and guided to the receiving-table by the guide B', the edge of which rests upon the upper surface of the conveyer W, as shown in Fig. 1, and as the molding is brought forward from the die-wheel it passes beneath the molding and separates it from the conveyer.

The guide B' is attached to the shaft C', and is secured in place and adjusted by set-screws passing through the frame A of the machine and screwing into the ends of the said shaft C'. The shaft S revolves in adjustable bearings attached to the frame A, so that it may be removed when necessary for changing the die-wheel A'. The die-wheel A' is removable, being held in place by the nut D', and it may be made solid, as shown in the drawings, or it may be made in three parts, the central part, upon the face of which the design is cut, being separate from the two end pieces. The edges of the two end pieces, or the sides of the wheel, when in one piece project beyond the central part, upon which the design is cut, so as to form smooth side edges to the molding. The pressure of the die-wheel A' upon the conveyer W is regulated by the shaft S, the bearings U' of which are adjustable. Upon the rear end of the upper part of the bearings U' is formed a tongue or tenon, which enters a slot or mortise in the upright part of the frame A, and the forward end is held down by the set-screws $V^2$ pressing the die-wheel A' upon the conveyer W with any desired force.

D' is an oil-cup attached to the side of the outer case, K, of the hopper in such a position that oil may drop therefrom constantly upon the die-wheel A', so as to keep the surface of said wheel moistened, so that the molding may not adhere to it. If desired, a brush may be attached to the oil-cup D' directly through its nozzle, so as to spread the oil evenly over the surface of the die-wheel A'.

It frequently happens that some parts of the design to be stamped upon the molding are heavier than other parts, requiring more material to fill up that part of the die. This renders it necessary that the flow of material from the hopper should be greater at some times than at others. To accomplish this I place a sliding valve or gate, E', in the mouth of the discharging-orifice of the hopper, so arranged that when closed it will allow the ordinary amount of material to escape, and when more widely opened a larger amount will escape. To the projecting end of this valve or gate E' is connected an arm, F', by a rule-joint or equivalent connection. The other end of the arm F' is pivoted to the lever G', as shown in Fig. 1. The lever G' extends across the rear end of the machine, and is pivoted at one end to a projecting ear, H', attached to one side of the frame A of the machine. The other end is attached to the end of the bent lever I', which is pivoted to the side of the frame A of the machine.

J' is a coiled spring, one end of which is attached to the frame A of the machine and the other end to the end of the lever I, as shown in dotted lines in Figs. 1 and 2. This spring holds the lower end of the lever I pressed down upon the face of the pulley K' and keeps the valve or gate E' closed, so that only the ordinary amount of material can escape. This coiled spring may be replaced by a spring of any other form or by a constant weight and pulley if desired. In the face of the pulley K' are holes, in which are fitted bolts L', having cam-shaped heads, as shown in Fig. 1. These cams are made adjustable by set-screws which pass in through the side of the pulley and hold the cam at any desired elevation. As the cam L', by the revolution of the pulley K', is brought into contact with the end of the bent lever I', it forces it out and opens the discharging-orifice of the hopper more or less, according to the elevation of the cam L'. The drawings represent only one cam as being attached to the pulley K'; but any number of cams may be so attached, and they may be all of the same height, or they may be of different heights, according as the design of the intended molding may render necessary.

M' is a cone-pulley attached to the end of the shaft U, and which is connected by a band N′, to the cone-pulley O′, attached to the end of the shaft that carries the pulley K′. By this arrangement I can run the pulley K′ at any desired velocity, and thus operate the valve E′ more frequently or at longer intervals, as the form of the design may render necessary.

P′ is a pulley pivoted to supports R′, attached to the foundation of the frame A. The face of the pulley P′ is grooved with a groove of sufficient width to receive the conveyer W and act as a guide to keep the said conveyer in the right position to receive the material from the hopper. The bottom of this groove is lined with leather, felt, rubber, or some other yielding material. Motion is communicated to the pulley P′ by a band, S′, passing around the grooved end of said pulley and around the shaft R, as shown in Fig. 1.

As the machine is operated the conveyer is cleaned by the pulley P′, and passes clean beneath the hopper to receive the material therefrom.

T′ is a scraper attached to the frame A of the machine in such a position with reference to the pulley P′ that as the said pulley revolves the scraper T′ will remove from it all the dirt which it may have removed from the conveyer W.

The hopper J K can be removed for cleaning the hopper and screw when necessary, or when done using, by removing the lever G′, valve-rod F′, and valve E′, and the screws by which the flanges L are secured to the flanges $a^2$. Then, by turning the hopper one-quarter around and passing it downward and outward, it can be readily removed from the screw and from the frame of the machine. It should also be observed that the nozzle W′, through which the discharging-orifice of the hopper is formed, is made detachable, so that it may be removed and replaced by another, according as the character of the molding may require a larger or smaller stream of the material to escape constantly from the hopper.

What I claim as new, and desire to secure by Letters Patent, is—

1. The cone-shaped hopper formed by combining the inner case, J, and outer case, K, with each other and with the frame A of the machine, substantially as herein described, and for the purpose set forth.

2. The combination, with the hopper J K, of the conveyer W, substantially as described, and for the purpose set forth.

3. The combination of the die-wheel A′, constructed substantially as described, with the conveyer W and with the frame A of the machine, substantially as described, and for the purpose set forth.

4. The combination, with the conveyer W, of an adjustable slide or scraper, B′, constructed and arranged substantially as described, and for the purpose set forth.

5. The combination, with the hopper J K, of the screw H I, constructed and arranged substantially as described, and for the purpose set forth.

6. The combination of the valve E′, arm F′, levers G′ I′, and cam K′ L′ with each other, with the hopper J K, and with the frame A of the machine, substantially as described, and for the purpose set forth.

7. The combination of the rubber or cleaner P′ and scraper T′ with each other and with the conveyer W, substantially as described, and for the purpose set forth.

8. The combination of the oil-cup D′ with the hopper J K and with the die-wheel A′, substantially as described, and for the purpose set forth.

THOS. J. CLOSE.

Witnesses:
G. J. NAYLOR,
WM. JONES.